3,466,262
ALKALINE DEGRADATION OF OXYMETHYLENE
POLYMER IN THE PRESENCE OF A SOLUTION
OF FORMALDEHYDE
Kenneth Barrell, Wordsley, and William Phillips, West
Bromwich, England, assignors to British Industrial Plastics Limited, Manchester, England, a corporation of
the United Kingdom
Filed June 22, 1967, Ser. No. 657,717
Claims priority, application Great Britain, June 24, 1966,
28,440/66
Int. Cl. C08g 1/28
U.S. Cl. 260—67
23 Claims

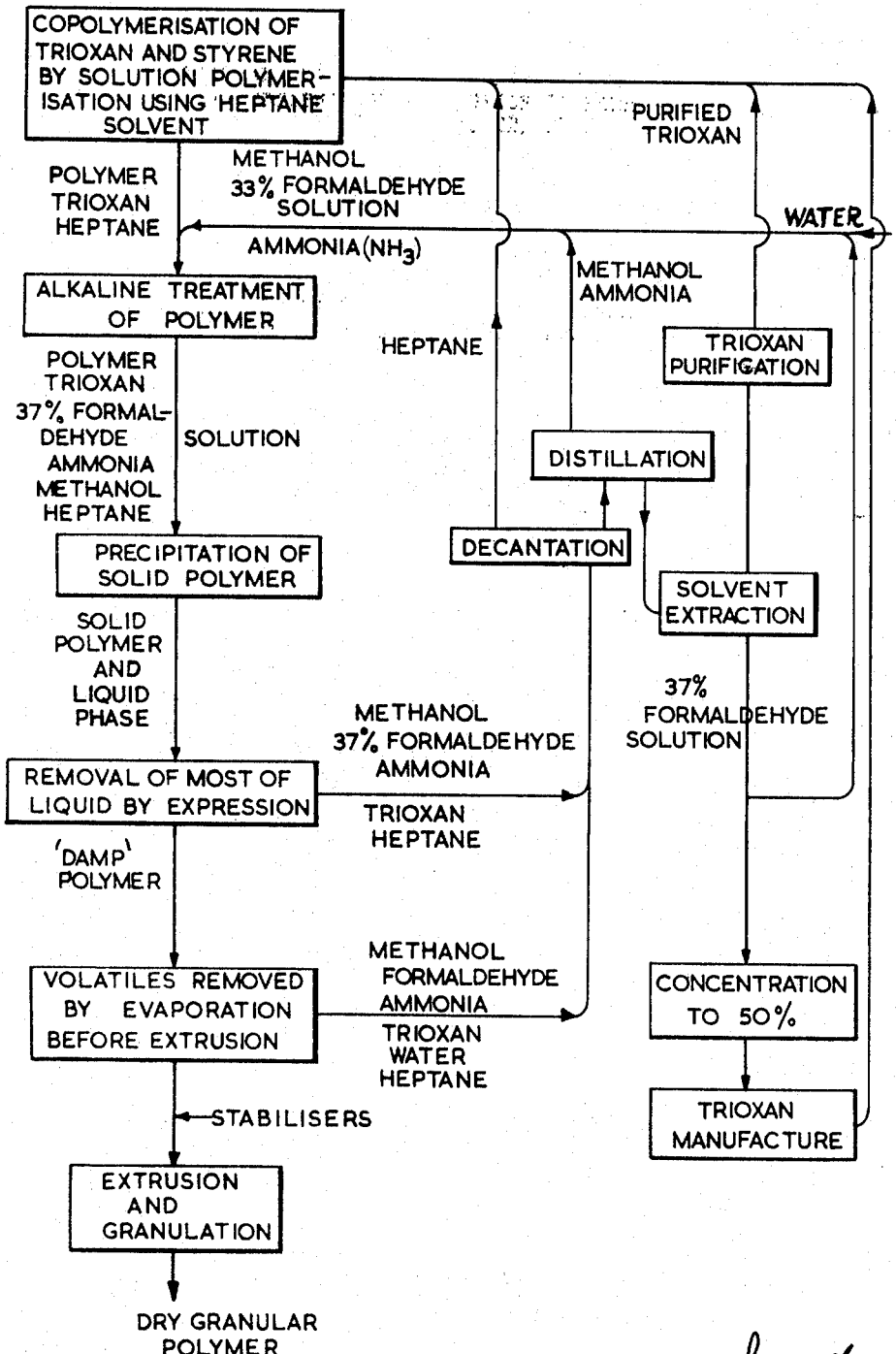

ABSTRACT OF THE DISCLOSURE

Oxymethylene polymers are stabilized by subjecting the polymer to alkaline degradation in the presence of a solution of formaldehyde containing at least 10% of the formaldehyde based on the liquid medium or at least 10% of the water present when the medium comprises at least 10% water.

---

This invention relates to oxymethylene polymers, and is especially concerned with a process for improving the stability thereof.

Oxymethylene polymers have recurring —CH$_2$O— groupings directly attached to each other, and they tend to be thermally unstable to some extent. This is disadvantageous in that if they suffer thermal degradation to any marked degree, products moulded from them may have poor surface characteristics due to evolution of gases resulting from degradation of the polymer caused by the heat applied during the moulding process. It is, therefore, desirable to remove at least some of the heat degradable material from the polymer so that there is less likelihood of gases being evolved during processing.

It has been suggested to improve the thermal stability (i.e. to reduce degradation due to heat) of oxymethylene polymers obtained by the copolymerisation of trioxan with a cyclic ether, such polymers containing, interspersed with oxymethylene groups, oxyalkylene units having two or more adjacent carbon atoms, by heating the polymers under non-acidic conditions with water, an organic hydroxy compound, or a mixture of these. The principal hydrolysis degradation product of oxymethylene polymers is formaldehyde, and in the process described above the formaldehyde evolved is dissolved in the water or the organic hydroxy compound and removed from the polymer in this way as a dilute solution. Because of difficulties of concentration this cannot usually be recovered economically for the preparation of further polymeric material, and loss of this formaldehyde can considerably increase the cost of producing thermally satisfactory polymers.

It is believed that a stabilisation process such as the one described above is applicable where the polymer chain is such that formaldehyde can be derived from it by successive detachment of —CH$_2$O— units, until a "stable grouping" is reached when detachment of the —CH$_2$O— units ceases. This process of detaching —CH$_2$O— units is sometimes referred to as "unzipping." The "stable grouping" in the stabilisation process already described is obtained by incorporating a cyclic ether, for example

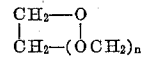

having at least two adjacent carbon atoms, into the polymer molecule.

Other ways of introducing "stable groupings" which may be mentioned by way of example include copolymerising trioxan in the presence of electrophilic catalysts, for example Lewis acids, with such comonomers as, for example, styrene or its derivatives, vinyl-substituted heterocyclic compounds, aliphatic and alicyclic unsaturated hydrocarbons, and allyl compounds. Oxymethylene polymers containing such "stable groupings" may also be obtained from formaldehyde by copolymerisation reactions involving various comonomers.

Other useful comonomers for this purpose (i.e. of introducing a "stable grouping" into the polymer chain) are compounds of the general formula

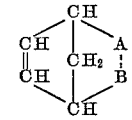

where A . . . B represents the grouping —CR$_1$=CR$_2$—, R$_1$ and R$_2$ (same or different) being hydrogen, an alkyl group, an aryl group or an aralkyl group. We have found that a particularly preferred comonomer of this kind is 2,2,1-bicyclo-hepta-2,5-diene, and the copolymerisation reaction of this is described in our patent application No. 46,158/65. Still further useful comonomers for this purpose are 2,2,1-bicyclo-hept-2-ene and derivatives thereof (see our copending patent application No. 41,554/65). The comonomers are normally reacted with trioxan in an amount of 0.1 to 50%, preferably 0.5 to 20%, by weight based on the total weight of trioxan and comonomer.

For the purpose of this specification, by "stable grouping" we mean a group of atoms situated in a polymeric molecule which is capable of preventing or hindering alkaline degradation of the polymer molecule.

The present invention provides an improved process for the treatment of an oxymethylene polymer which comprises subjecting the polymer to alkaline degradation in the presence of a solution of formaldehyde of relatively high concentration.

The process of the invention is especially applicable to the treatment of oxymethylene copolymers containing stable groupings, but it may also be used to improve the thermal stability of oxymethylene homopolymers, which may be prepared, for example, by the homopolymerisation of formaldehyde or trioxan.

Oxymethylene polymers may be treated in accordance with the invention immediately after formation, or they may be washed or otherwise processed to remove catalysts and solvent residues prior to treatment. They may be treated in finely divided solid form (i.e. as a slurry), but more usually they will be treated while in solution.

Oxymethylene polymers are insoluble in most of the usual solvents, e.g. water, alcohols, at normal temperatures, and in order to bring about dissolution an elevated temperature may be needed in addition to a suitable solvent. In some cases a combination of solvents may be necessary. When lower boiling point solvents are employed pressures greater than atmospheric will be required if a high temperature is necessary for dissolution of the polymer; high pressures may also be required to maintain the components of the reaction mixture in the liquid phase.

Preferably, therefore, the process of the invention comprises dissolving the polymer in a solvent, adding a solution of formaldehyde of relatively high concentration, and subjecting the polymer to alkaline degradation.

As mentioned above, oxymethylene polymers are generally rather insoluble in either water or an alcohol alone, whereas alcohol/water mixtures are quite good solvents if processing conditions are suitable. For example, preferred solvents for a trioxan/styrene copolymer are methanol/water, ethanol/water, n-propanol/water and isopropanol/water. The proportions of alcohol and water can be varied within wide limits; for example alcohol/water ratios of 90:10 to 10:90, particularly 85:15 to 30:70, have been found suitable. The optimum proportions can easily be determined by simple trial. Other solvents that may be employed include mixtures of water with any of other alcohols, alkanolamines, ketones and ethers which do not themselves undergo reaction under the treatment conditions.

Although it is possible to bring about the improvement in thermal stability by heating the polymer with any of a wide range of alkaline materials which are soluble in the solvent or suspending medium employed, for example sodium hydroxide, potassium hydroxide, sodium carbonate, sodium acetate, borax, etc., it is convenient to use for this purpose an easily volatile alkaline material. By this we mean an alkaline material which can be removed from the polymer by heating (if necessary under vacuum) at a temperature lower than the melting point of the polymer, preferably by heating at a temperature below 100° C. Several such substances are very suitable for use according to the invention, including primary, secondary and tertiary amines, for example those having 1–20 carbon atoms such as mono-, di- and trimethyl amine, mono-, di- and triethylamine, mono-, di- and tripropylamine and the n-butylamines, hexylamine and dodecylamine, and heterocyclic amines such as pyridine and morpholine. Others include triethanolamine and trimethylguanidine, and mixtures of any of these may be used. We prefer to use ammonia or triethylamine.

The amount of alkaline material to be used in the process of the invention may be in the range of about 0.05 to 25%, preferably 0.1–5%, by weight, based on the weight of the polymer. In general we find that a better colour of product is obtained when a volatile rather than a non-volatile alkaline material is used, although the pH of the reaction mixture also influences product colour, a pH below 10 being preferred. When high pH values and/or non-volatile alkaline materials are used there is a tendency for the product to be brown, which may be undesirable.

The ratio of solvent (when polymer in solution) or suspending medium (when polymer in slurry form) to polymer can vary within very wide limits and the selection of suitable proportions will present no difficulty to the man skilled in the art. However, we usually prefer to use the solvent or suspending medium in an amount of from 8 to 30 times the weight of the polymer, although amounts outside this range can usefully be employed.

The concentration of formaldehyde in the reaction mixture (i.e. the mixture of reactants and solvents in which the polymer is treated with alkaline material according to the invention) can vary within quite wide limits. The formaldehyde may be employed in water, a non-aqueous medium, or a mixture thereof, preferably the latter, e.g. a mixture of water and ethanol.

The concentration of formaldehyde in the reaction mixture can, as mentioned above, vary within quite wide limits, but it depends to some extent on the particular composition of the liquid reaction medium. Thus, when the reaction medium comprises 10–100% by weight water, the concentration of formaldehyde should not be less than 10%, is suitably between 20% and 60%, and preferably is between 30% and 55% by weight, based on the amount of water present. When the reaction medium is a non-aqueous medium the concentration of formaldehyde is as above, but based on the amount of non-aqueous medium. When the reaction medium is a mixture of up to 10% water with a non-aqueous medium, then the concentration of formaldehyde is as set out above, but based on the total of water and non-aqueous medium. These are the relevant percentages at the beginning of the alkaline treatment of the polymer. As formaldehyde is generated during the treatment the concentration is formaldehyde in the reaction mixture will, of course, increase. In a preferred process, for example, formaldehyde is added to the reaction mixture in an amount sufficient to give a concentration (based on the total amount of water) of about 48%, and at the end of the alkaline treatment the concentration may have risen to about 52%. An initial concentration of formaldehyde of more than 60% may be used, but in such a case there is a possibility of excess formaldehyde precipitating out as paraform. This could be overcome by diluting the solution as it is removed from the reaction zone.

When the oxymethylene polymer to be treated has been obtained by the polymerisation of trioxan, a proportion of the unreacted monomer will often be present mixed with the polymer product. Since this is stable to alkaline treatment it may simply be recycled to the polymerisation vessel.

The alkaline treatment of the invention proceeds quite rapidly, particularly when the polymer is treated while in solution, when the treatment time will usually be between 5 seconds and 30 minutes, depending upon the treatment conditions. Usually it will be between 10 seconds and 2 minutes. The temperature at which treatment is carried out is suitably between 80° C. and 200° C., preferably between 130° C. and 180° C.

The following examples are given for the purpose of illustrating the invention, references to parts being to parts by weight.

Example 1

An oxymethylene copolymer was prepared by solution copolymerisation of trioxan and styrene in the presence of an electrophilic catalyst, and 160 parts of the resulting copolymer (contaminated with the polymerisation solvent, heptane, and unconverted monomer), which was pure white, were mixed with 800 parts methanol, 378 parts formaldehyde, 756 parts water (giving a 33% formaldehyde solution in water) and 2 parts ammonia ($NH_3$).

The reaction vessel employed consisted of a coiled stainless steel tube 20 m. long and 3 mm. internal diameter. The reaction vessel was fitted with a steam jacket whereby the contents of the reaction vessel could be heated rapidly to the desired temperature. The pressure inside the reaction vessel could be maintained above ambient.

Steam at 8.8 kg./sq. cm. was circulated around the reaction vessel, and when the reaction mixture was pumped into the reaction vessel and maintained under a pressure of 21.8 kg./sq. cm. its temperature was raised very rapidly to 170° C. The reaction mixture remained in the reaction vessel for 50 seconds, after it was transferred to a water cooled condenser chamber where the copolymer precipitated out of solution as a white pulpy mass.

The bulk of the liquid phase was removed from the copolymer by expression, the remainder being removed by evaporation under vacuum in a heated screw extruder. Heptane was removed by decantation and the remaining liquid was passed to a distillation apparatus where the ammonia and methanol were distilled off under vacuum to be recycled for use in a subsequent polymer treatment; the trioxan and formaldehyde were then separated by solvent extraction, the trioxan being recirculated for polymerisation, and the formaldehyde solution (now 37% by weight) being concentrated to 50% by weight before being used for the production of more trioxan. The drawing is a flow diagram showing the various stages of treatment carried out in this example.

The extruded treated copolymer (yield about 65%) was white, and its thermal degradation was 0.017% per minute at 222° C. The thermal degradation of the untreated polymer was 1% per minute at 222° C.

It is to be noted that all the solvents and reagents employed are obtained at the end of the alkaline treatment in an easily re-usable form, and may conveniently be recycled to the appropriate stations for further use.

Example 2

The procedure described in Example 1 was repeated, using triethylamine instead of ammonia as the alkaline treating material. The triethylamine was employed in an amount of 1.7% by weight based on the polymer.

The polymer, after the alkaline treatment, was white, and had a thermal degradation of 0.04% per minute at 222° C. That of the untreated polymer was 1% per minute at 222° C.

Example 3

The procedure described in Example 1 was again repeated, using sodium hydroxide as the alkaline treating material. The sodium hydroxide was present in an amount of 0.3% by weight based on the polymer.

The colour of the extruded polymer was light brown, and it had a thermal degradation of 0.12% per minute at 222° C. That of the untreated polymer was 1% per minute at 222° C.

Examples 4–6

Examples 1–3 were repeated, except that the formaldehyde was added to the polymer solution in an amount of 45% by weight based on the weight of water present. The formaldehyde solution obtained after treatment of the polymer was found to contain about 50% by weight formaldehyde, and was recycled without further concentration, and in admixture with the trioxan washed from the polymer, to the trioxan production unit.

Examples 7–12

Examples 1–6 were repeated, except that the polymer treated was a polymer obtained by the copolymerisation of trioxan and the cyclic ether which is sold under the trade name "I.C.I. Acetal." The products showed improvement of stability characteristics similar to those of the products of the corresponding Examples 1 to 6.

In a preferred process, where ammonia and/or methanol are used, it is believed that the methanol and ammonia stabilise the formaldehyde and prevent undesirable polymerisation of the formaldehyde taking place. It is therefore desirable that no formaldehyde is allowed to remain in the polymer in the absence of methanol or ammonia. For this reason, it is very desirable that the removal of volatile materials from the polymer after treatment should occur rapidly, as in a screw extruder, where, as a result of the rather high temperatures reached and the large surface area of polymer exposed during working, evaporation is rapid. It is found, however, that if evaporation is allowed to proceed slowly, as in a heated paddle mixer, ammonia and methanol are evolved rapidly, leaving formaldehyde in the polymer with the result that some polymerisation to paraformaldehyde may occur.

What we claim is:

1. A process for the treatment of an oxymethylene polyme which comprises subjecting the polymer to alkaline degradation in the presence of a solution of formaldehyde in which the formaldehyde is initially present in a concentration of at least 10% by weight, based on (a) the total water content of the liquid reaction medium when the said medium comprises at least 10% by weight of water, or (b) the total weight of the liquid reaction medium when said medium is completely non-aqueous or contains up to 10% by weight of water.

2. A process as claimed in claim 1 which comprises dissolving the polymer in a solvent for the polymer, adding to the polymer solution a solution of formaldehyde of relatively high concentration, and subjecting the polymer to alkaline degradation.

3. A process as claimed in claim 1 which comprises suspending the polymer in a suspending medium, adding to the polymer suspension a solution of formaldehyde of relatively high concentration, and subjecting the polymer to alkaline degradation.

4. A process as claimed in claim 2 wherein the solvent for the polymer is an alcohol-water mixture.

5. A process as claimed in claim 4 wherein the alcohol component of the solvent is methanol, ethanol, n-propanol or iso-propanol.

6. A process as claimed in claim 4 wherein the respective proportions of alcohol and water in the solvent are from 90:10 to 10:90.

7. A process as claimed in claim 2 wherein the solvent for the polymer is a mixture of water with an alkanolamine, a mixture of water with a ketone or a mixture of water with an ether.

8. A process as claimed in claim 3 wherein the suspending medium is water or an alcohol.

9. A process according to claim 1 wherein the alkaline degradation of the polymer is brought about by heating sodium hydroxide, potassium hydroxide, sodium carbonate or borax.

10. A process according to claim 4 wherein the alkaline material is used in an amount of 0.05 to 25% by weight based on the weight of the polymer.

11. A process according to claim 1 wherein the alkaline degradation of the polymer is brought about by heating with ammonia, mono-, di- or trimethylamine, mono-, di or triethylamine, mono-, di- or tripropylamine, mono-, di- or tri-n-butylamine, hexylamine, dodecylamine, pyridine, morpholine, triethanolamine or trimethylguanidine.

12. A process according to claim 11 wherein the alkaline material is used in an amount of 0.05 to 25% by weight, based on the weight of the polymer.

13. A process as claimed in claim 12 wherein the alkaline material is used in an amount of 0.1 to 5% by weight, based on the weight of the polymer.

14. A process as claimed in claim 1 wherein the pH of the reaction mixture is maintained below 10.

15. A process as claimed in claim 1 wherein the formaldehyde is initially present in a concentration of between 30 and 55%, on the same basis.

16. A process as claimed in claim 1 wherein the alkaline degradation is affected for a period of from 5 seconds to 30 minutes.

17. A process as claimed in claim 1 wherein the alkaline degradation is effected for a period of from 10 seconds to 2 minutes.

18. A process as claimed in claim 1 wherein the temperature of the alkaline degradation is between 80° C. and 200° C.

19. A process as claimed in claim 1 wherein the temperature of the alkaline degradation is between 130° C. and 180° C.

20. A process as claimed in claim 1 wherein the oxymethylene polymer is one which contains a stable grouping.

21. A process as claimed in claim 1 in which, after alkaline degradation, any volatile materials present in the reaction mixture are removed by working up the mixture in a screw extruder.

22. A process according to claim 1 including the steps of separating the formaldehyde from the polymer and recovering the formaldehyde.

23. A process according to claim 22 wherein the separated formaldehyde is recycled to form further amounts of oxymethylene polymer.

References Cited

UNITED STATES PATENTS

| | | |
|---|---|---|
| 2,989,509 | 6/1961 | Hudgin et al. |
| 3,174,948 | 3/1965 | Wall et al. |
| 3,301,821 | 1/1967 | Asmus et al. |
| 3,337,504 | 8/1967 | Fisher. |

WILLIAM H. SHORT, Primary Examiner

L. M. PHYNES, Assistant Examiner

U.S. Cl. X.R.

260—73, 615.5